United States Patent [19]
Almefelt et al.

[11] Patent Number: 5,951,045
[45] Date of Patent: *Sep. 14, 1999

[54] KNEE PROTECTION SYSTEM FOR A VEHICLE

[75] Inventors: Lars Almefelt, Göteborg; Ingemar Mattsson, Mörrum, both of Sweden

[73] Assignee: A B Volvo, Gothenburg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,525

[22] Filed: Mar. 26, 1997

[51] Int. Cl.⁶ .................................................. B60R 21/02
[52] U.S. Cl. ............................. 280/748; 180/90; 280/752
[58] Field of Search .................................... 280/748, 752, 280/751, 750; 180/90; 296/189, 191, 70

[56] References Cited

U.S. PATENT DOCUMENTS 5,456,494  10/1995  Witkovsky .
5,482,319   1/1996  Yoshimura et al. .
5,518,270   5/1996  Hanada et al. .

FOREIGN PATENT DOCUMENTS

| 195 11 512 A1 | 5/1996 | Germany . | |
|---|---|---|---|
| 5-310063 | 11/1993 | Japan | 280/752 |
| 6-80056 | 3/1994 | Japan | 280/752 |

*Primary Examiner*—Eric Culbreth
*Attorney, Agent, or Firm*—Samuels, Gauthier & Stevens, LLP

[57] ABSTRACT

A knee protection system for a vehicle in which the vehicle has a dashboard and a support member extending transversely across the vehicle within dashboard. The system includes at least one pair of brackets affixed to and spaced along the support member, with each bracket having an impact surface spaced from the dashboard. At least one reinforced panel affixed to existing components of the dashboard forms a part of the system. The panel is spaced from the impact surface of each bracket and comes into contact with the impact surface first when the vehicle is involved in a collision.

28 Claims, 6 Drawing Sheets

KNEE PROTECTION SYSTEM FOR A VEHICLE

TECHNICAL FIELD

The present invention relates to a knee protection system installed in a vehicle. More particularly, the invention relates to a knee protection system which is installed in a vehicle dashboard to hinder vehicle occupants from submarining under the vehicle dashboard in the event of a collision and to ensure that legs of an occupant sitting in either a driver's seat or a passenger seat in the vehicle are not subjected to excessively high forces.

BACKGROUND OF THE INVENTION

In order to minimize injury to occupants of a vehicle in the event that the vehicle be involved in a collision, vehicles are nowadays equipped with seat belts and, in many cases, airbag systems. It has been shown that risk of injury is greatly reduced when occupants wear the seat belts provided in the vehicle. Nevertheless, many vehicle occupants, either for physical or psychological reasons, do not make use of the seat belts. As a result, if the vehicle is involved in a collision, the occupant may be thrown forward such that the knees of the occupant impact the dashboard, possibly leading to injury to the occupant. Legislation in the United States (FMVSS 208) stipulates maximum values for the forces to which the femur of a vehicle occupant may be subjected in the event of a collision. Accordingly, knee protection systems have been developed with the intention of minimizing both the risk of submarining and of injury to the front seat occupants of a vehicle.

A knee protector device for installation inside a vehicle dashboard is disclosed in U.S. Pat. No. 5,518,270 and comprises a protector body and a pair of spaced-apart brackets connected to the protector body. Each bracket is constituted by a lower portion and an upper portion.

Because the protector body extends transversely between the brackets, the device is relatively bulky. Given the number of components which have to be housed within a vehicle dashboard, it would be advantageous to provide a system which required less space. Furthermore, the brackets of the above-identified system are relatively complex, something which leads to increased production costs.

Another knee protection system employing a pair of spaced-apart brackets is known from DE-A-195 11 512. One end of the brackets is secured to a transversely extending support member within the vehicle dashboard, whilst the free ends of the brackets are secured to a panel of the dashboard. The panel is specifically designed to transmit impact forces from the knees of an occupant to the brackets. One disadvantage with the system disclosed in said document is that because the brackets are secured to the dashboard, close production tolerances are required. This disadvantage is shared by the system disclosed in U.S. Pat. No. 5,456,494.

U.S. Pat. No. 5,482,319 discloses a passenger knee protection device which is provided with means for restricting movement of equipment within the dashboard into the passenger compartment of the vehicle in the event of a collision. The system works in combination with a glove compartment within the dashboard. A disadvantage with this known system is the amount of space which it occupies within the dashboard.

SUMMARY OF THE INVENTION

It is therefore an object of the present invention to provide a knee protection system which is simple to manufacture and install in a vehicle and which demands less space than conventional systems.

This object is achieved by a knee protection system for a vehicle, the vehicle comprising a dashboard and a support member extending transversely across the vehicle within the dashboard. In accordance with the invention, the system comprises at least one pair of brackets affixed to and spaced along the support member, each bracket having an impact surface spaced from the dashboard, and at least one reinforced panel affixed to existing components of the dashboard, the panel being spaced from the impact surface of each bracket.

In accordance with another aspect of the present invention, there is provided a knee protection system for a vehicle, the vehicle comprising a dashboard and a support member extending transversely across said vehicle within the dashboard, the vehicle having a passenger side and a driver's side. The system comprises a first pair of brackets affixed to and spaced along the support member on the driver's side, with each bracket of the first pair of brackets having a first free end region for attachment to the support member and a second free end region remote from the support member. The system further comprises a second pair of brackets affixed to and spaced along the support member on the passenger side, the first pair of brackets being adapted to cooperate with a first reinforced panel on the dashboard on the driver's side and the second pair of brackets being adapted to cooperate with a second reinforced panel on the dashboard on said passenger side. Each bracket of the second pair of brackets has a first distal end and a second distal end, the first and second distal ends being affixed to the support member such that the bracket and a portion of the support member form a closed loop having a flattened portion opposite the support member.

BRIEF DESCRIPTION OF THE DRAWINGS

The invention will be described in the following in greater detail by way of example only and with reference to the attached drawings, in which.

DETAILED DESCRIPTION OF PREFERRED EMBODIMENTS

Figure 1:
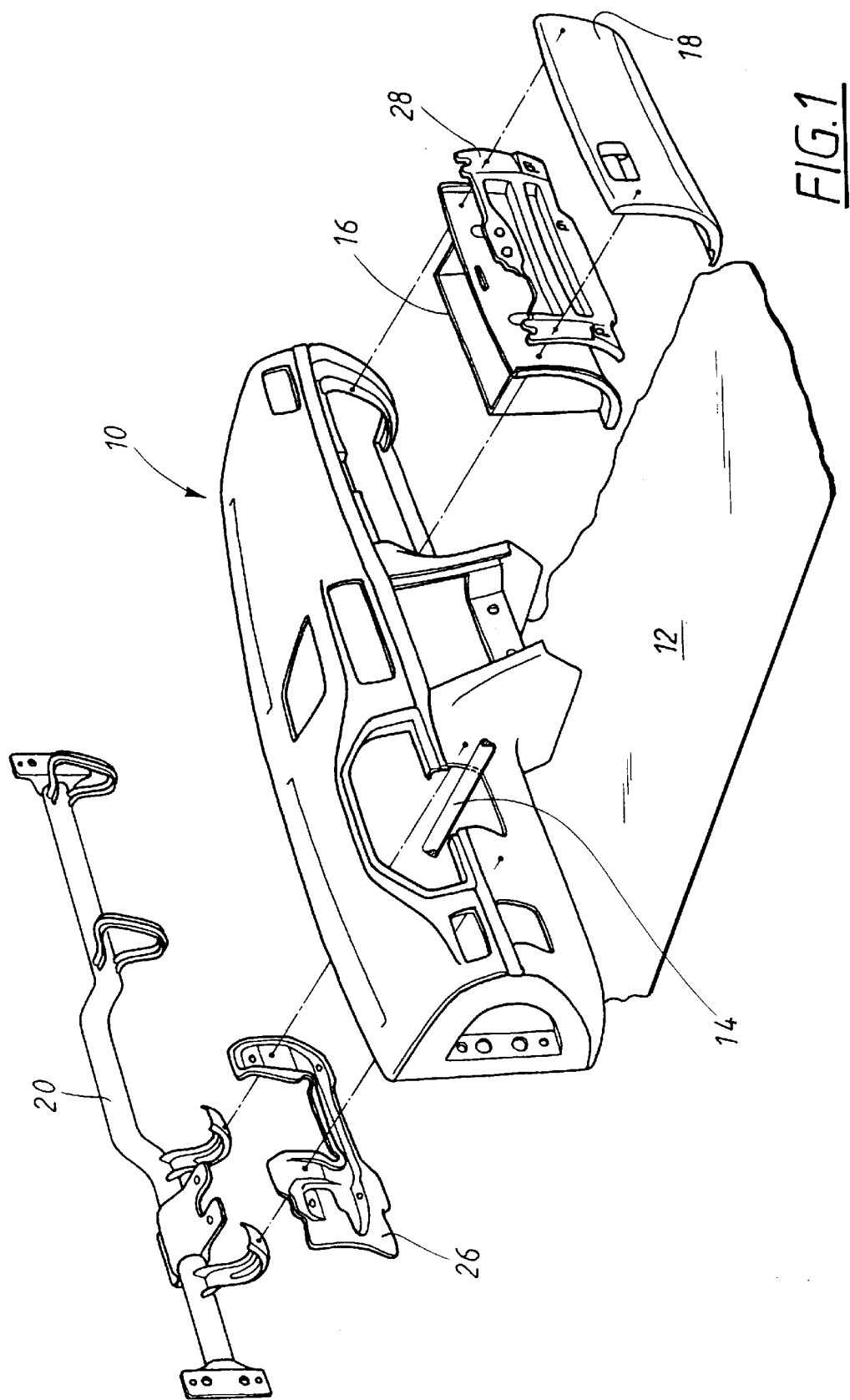
FIG. 1 is a schematic perspective view of a vehicle dashboard equipped with the knee protection system according to the present invention.

In the drawings, reference numeral 10 generally denotes a vehicle dashboard mounted within a vehicle 12. The vehicle has a driver's side provided with a steering column 14 and a passenger side. The dashboard 10 may be provided with a glovebox 16 on the passenger side. Access to the glovebox is permitted via a lid 18.

As is customary nowadays, a support member 20 is arranged within the dashboard, the support member extending transversely across the vehicle. The support member serves i.a. to support the steering column 14. Although in the drawings the support member is shown as a length of tubing, it is to be understood that the support member may be in the form of a fabricated structural member integrated with the dashboard and capable of providing sufficient support for e.g. a steering column.

Figure 2:
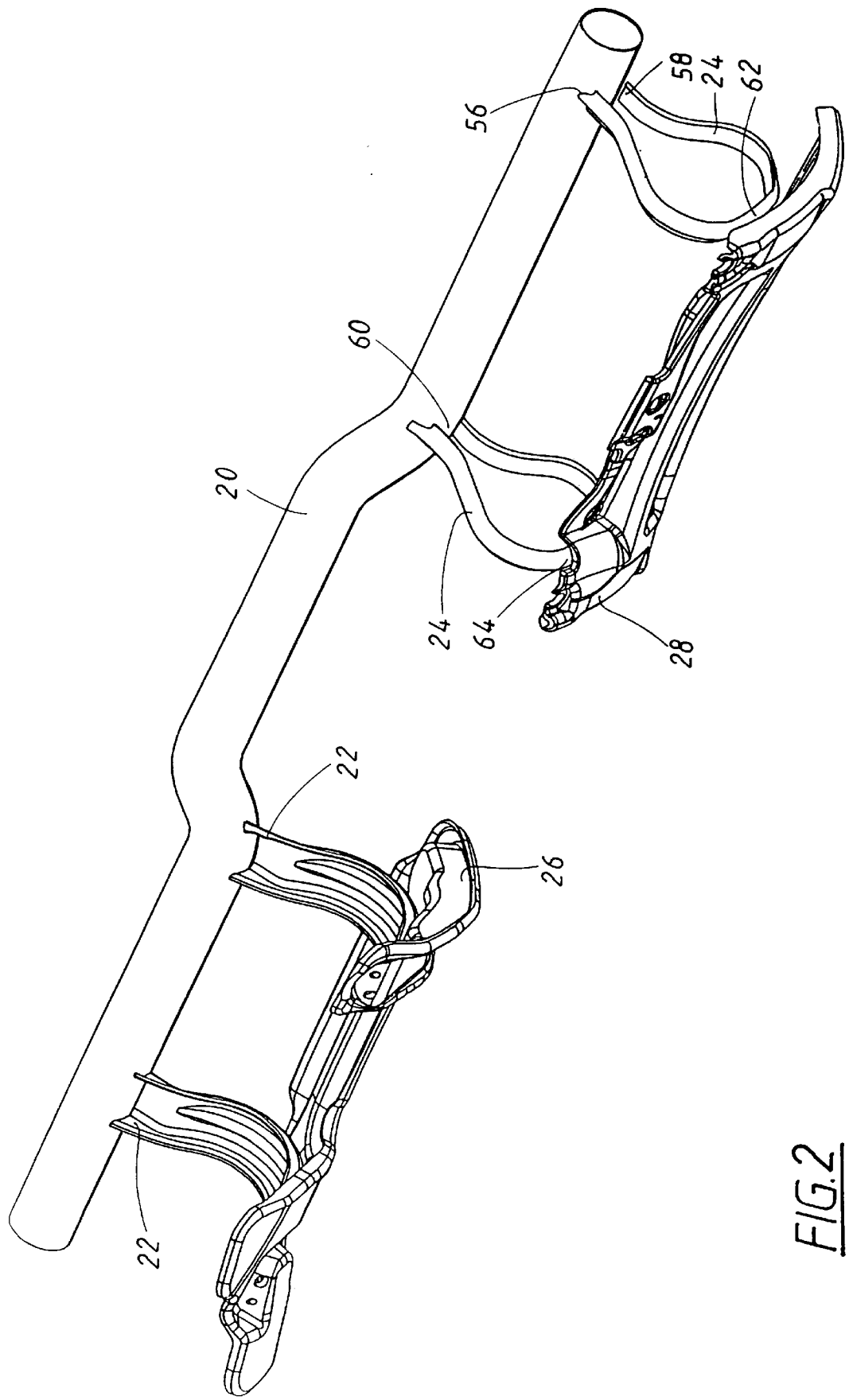
FIG. 2 is a schematic perspective view of the knee protection system according to the present invention.

As is most clearly visible from FIG. 2, and in accordance with the present invention, the support member 20 serves to support at least one pair of brackets of a knee protection system. The knee protection system further includes a reinforced panel for cooperation with the pair of brackets in the event of a collision. Preferably, the system includes a first pair of brackets, each bracket denoted by reference numeral 22, on the driver's side of the vehicle and a second pair of brackets, each bracket denoted by reference numeral 24, on the passenger side of the vehicle. The brackets are spaced along the support member and affixed thereto in any suitable manner, for example by welding. The first pair of brackets 22 is arranged to cooperate with a first reinforced panel 26 while the second pair of brackets 24 is arranged to cooperate with a second reinforced panel 28.

In order to simplify manufacture and assembly, the first and second panels 26, 28 are affixed to existing components of the dashboard 10. Furthermore, there is no contact between the dashboard and the brackets even when the panels are fitted. This implies that close production tolerances are not needed and assembly is simplified. Thus, the panels come into contact with the brackets first when a collision takes place and the knees of an occupant displace one of the panels towards its respective brackets.

Figure 3:
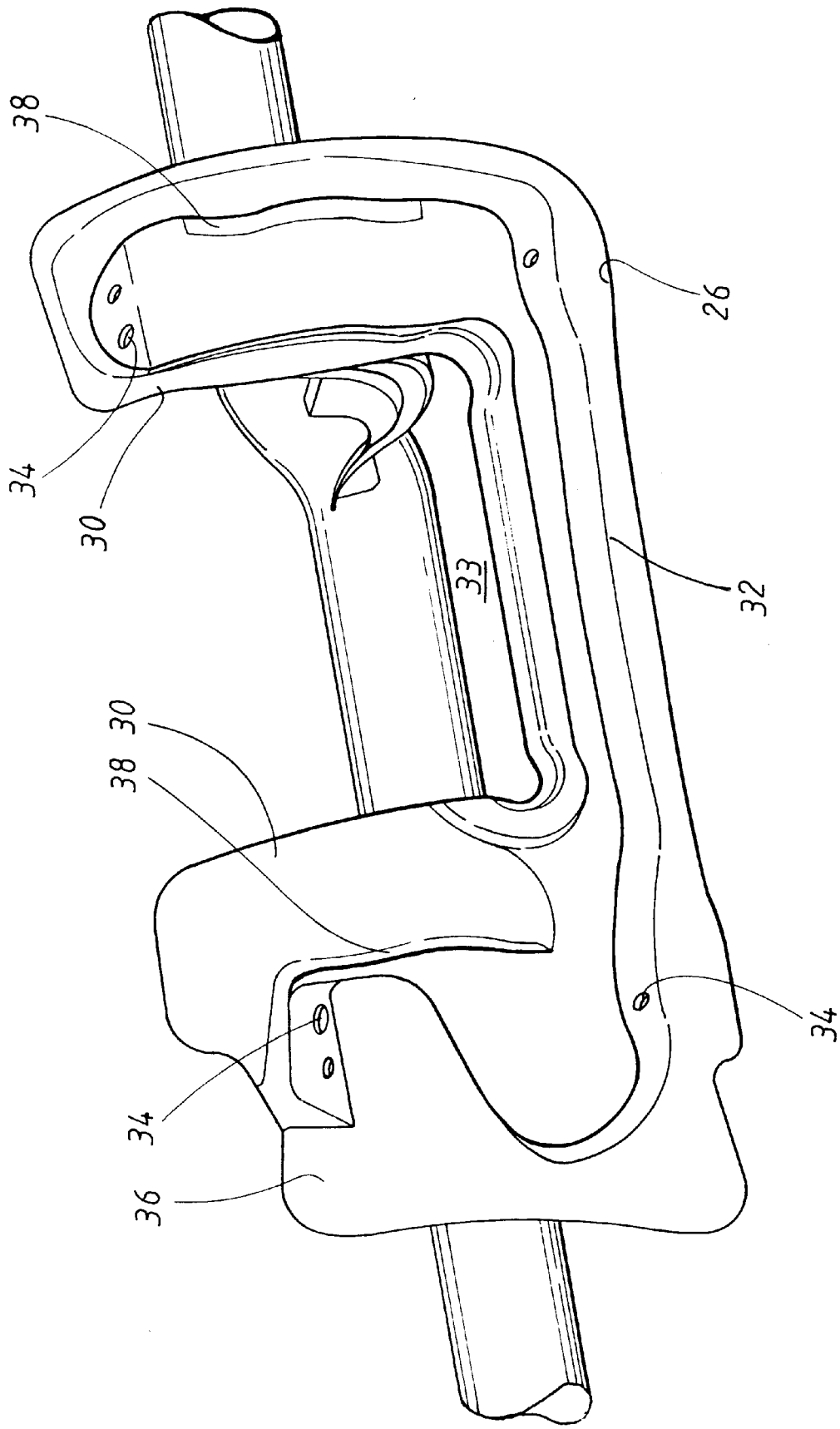
FIG. 3 is a schematic perspective view of a first reinforced panel for use in the system of the present invention.

With particular reference to FIGS. 1 and 3, the first reinforced panel 26 has a generally U-shape comprising a pair of generally parallel members 30 and an intermediate member 32. The parallel members 30 and the intermediate member 32 partially define a U-shaped opening 33 through which the steering column 14 of the vehicle can protrude. The panel 26 is provided with a number of openings 34 for not shown fastening means for permitting the panel to be affixed to an inner surface of the dashboard around the steering column.

As is most clearly shown in FIG. 3, the first reinforced panel 26 is provided with a laterally extended portion 36 arranged such that the U-shaped opening 33 is not centrally positioned on the panel but instead is offset to the right in the drawing. The laterally extending portion 36 serves to provide out-of-position protection for the left knee of the driver in left-hand drive vehicles. In other words, even if the left leg of the driver is not in a generally parallel position with respect to the steering column 14 when a collision takes place, but is instead splayed to the left, the left knee will still impact the dashboard at a location in front of the first reinforced panel 26. For right-hand drive vehicles, the panel 26 is a mirror-image of that shown in FIG. 3 such that the laterally extended portion 36 provides out-of-position protection for the right knee of the driver.

To ensure that the first reinforced panel 26 will cooperate with the first pair of brackets 22 in an intended manner, the panel 26 is provided with guide surfaces 38 formed in each parallel member 30. These guide surfaces 38 serve to ensure that the panel will not slide over the brackets in the event that an out-of-position force is applied to the panel.

In order to transmit impact forces from the knees of the vehicle occupant to the pair of brackets 22, the first reinforced panel 26 is advantageously made from a stiff material. A particularly suitable material is a glass mat thermoplastic, known as GMT, in the form of hot-pressed glass fibre reinforced polypropylene containing between 20% and 40% glass fibre. Preferably, two layers of GE Azdel PD1-1357, made by GE Plastics, are bonded together under compression to form the first reinforced panel 26. The thickness of the completed panel will depend i.a. on the degree of compression of the layers, but is generally between about 2.5 mm and 5 mm. The intermediate member 32 of the first reinforced panel 26 is designed such that it is more pliant than the parallel members 30. In this manner, the risk of the reinforced panel 26 damaging the steering column in the event of a collision is minimized.

As mentioned above, the parallel members 30 of the first reinforced panel are intended to come into contact with a respective one of said brackets of said first pair of brackets 22. A preferred design of each bracket 22 is illustrated in FIGS. 4 to 9. Thus, each bracket has a first free end region 40 for attachment to the support member 20 and a second free end region 42 which is generally upwardly curved with respect to the first free end region such that the bracket 22 is generally U-shaped in a plane of extension from the first free end region to the second free end region. The second free end region 42 incorporates an impact surface 44 arranged to face towards the first reinforced panel 26. In the event of a collision, the impact surface of each bracket will be impacted by a respective one of the parallel members 30 of the first reinforced panel 26.

Energy which arises as a result of an occupant's knees impacting the dashboard in the vicinity of the first reinforced panel 26 is absorbed by plastic deformation of the pair of brackets 22. The material, geometry and profile of the brackets are selected such that a rapid build up of force takes place and a substantially constant dissipation of energy is attained during a long deformation path. To this end, each bracket 22 is advantageously stamped in one piece from steel, preferably, 050XLF steel according to SAE 31392, and provided with a cross sectional shape which varies from the first free end region 40 to the second free end region 42, as shown in FIGS. 5 to 9. The bracket is not provided with any bend-initiating points or sections. Instead, the bracket is designed to bend at any region at which the ratio between bending moment and bending resistance is greatest.

Thus, the cross sectional shape of the bracket 22 is generally U-shaped with the bracket presenting outwardly extending continuous flanges 46. As is apparent from FIG. 6, the U-shape has maximum depth in the first free end region 40, whereafter the depth decreases towards the second free end region 44 until a first point 48 is reached at which the depth is a minimum (see FIG. 7). Thereafter, the bracket 22 exhibits a raised central portion 50 increasing in height from the first point 48 to a second point 52 along the bracket. The second point 52 generally coincides with a point at which the bracket becomes upwardly curved. Past the second point 52, the height of the raised central portion 50 thereafter decreases towards the second free end region 42 until, at a distal end 54 of the second free end region, the cross-sectional shape exhibits a substantially planar bottom 56.

Figure 4:
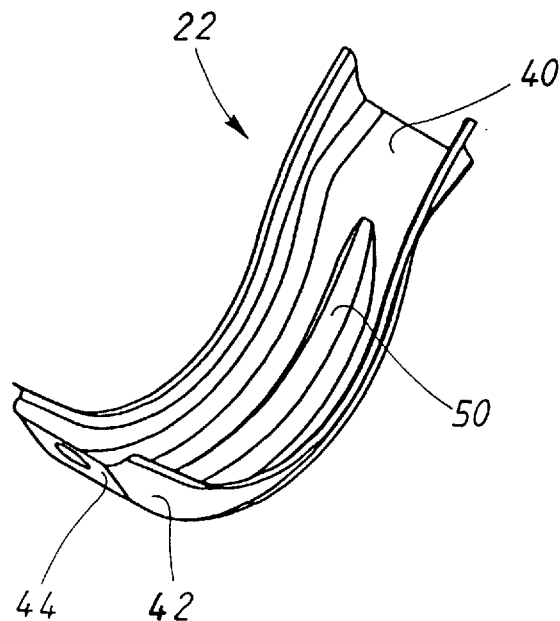
FIG. 4 is a perspective view of a first bracket for use in the system according to the present invention.
Figure 5:
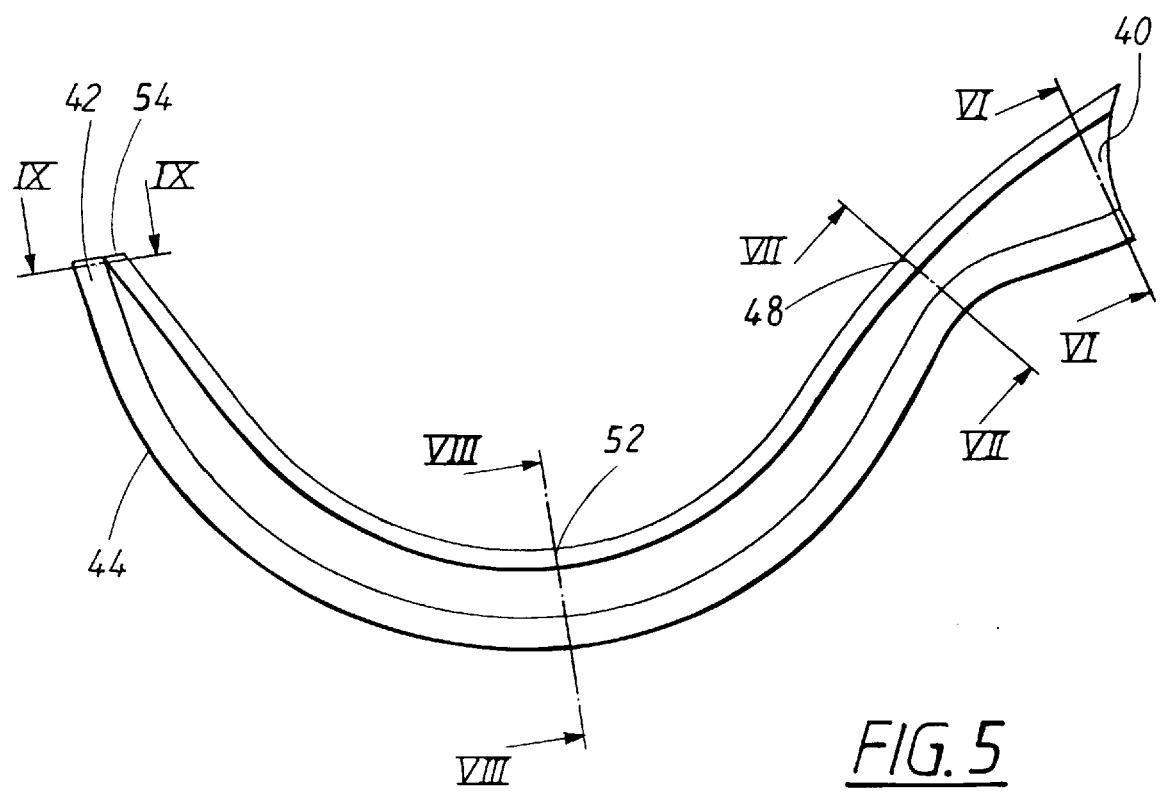
FIG. 5 is an elevational view of the bracket of FIG. 4.
Figure 6:
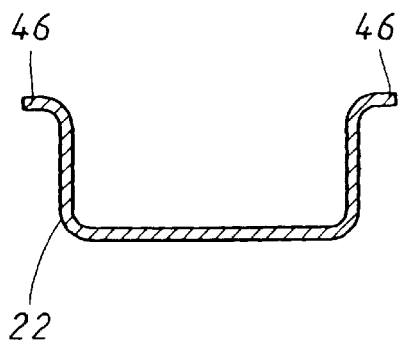
FIG. 6 is a sectional view along line VI—VI of FIG. 5.
Figure 7:
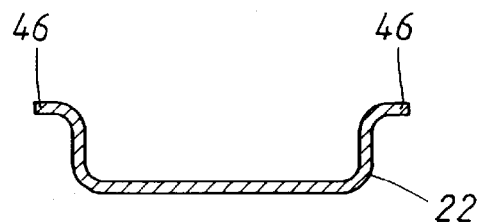
FIG. 7 is a sectional view along line VII—VII of FIG. 5.
Figure 8:
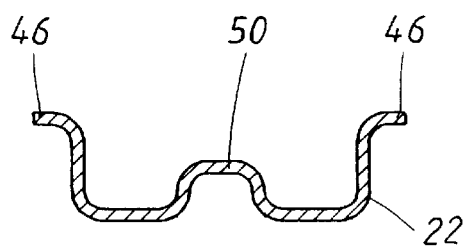
FIG. 8 is a sectional view along line VIII—VIII of FIG. 5.
Figure 9:
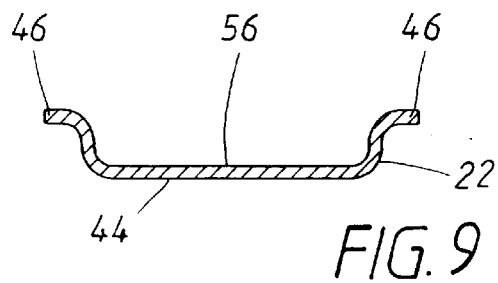
FIG. 9 is a sectional view along line IX—IX of FIG. 5.

As is most clearly apparent from FIGS. 4 and 5, the impact surface 44 is incorporated on a surface of the second free end region 42 facing away from the raised central portion 50 of the bracket.

Figure 10:
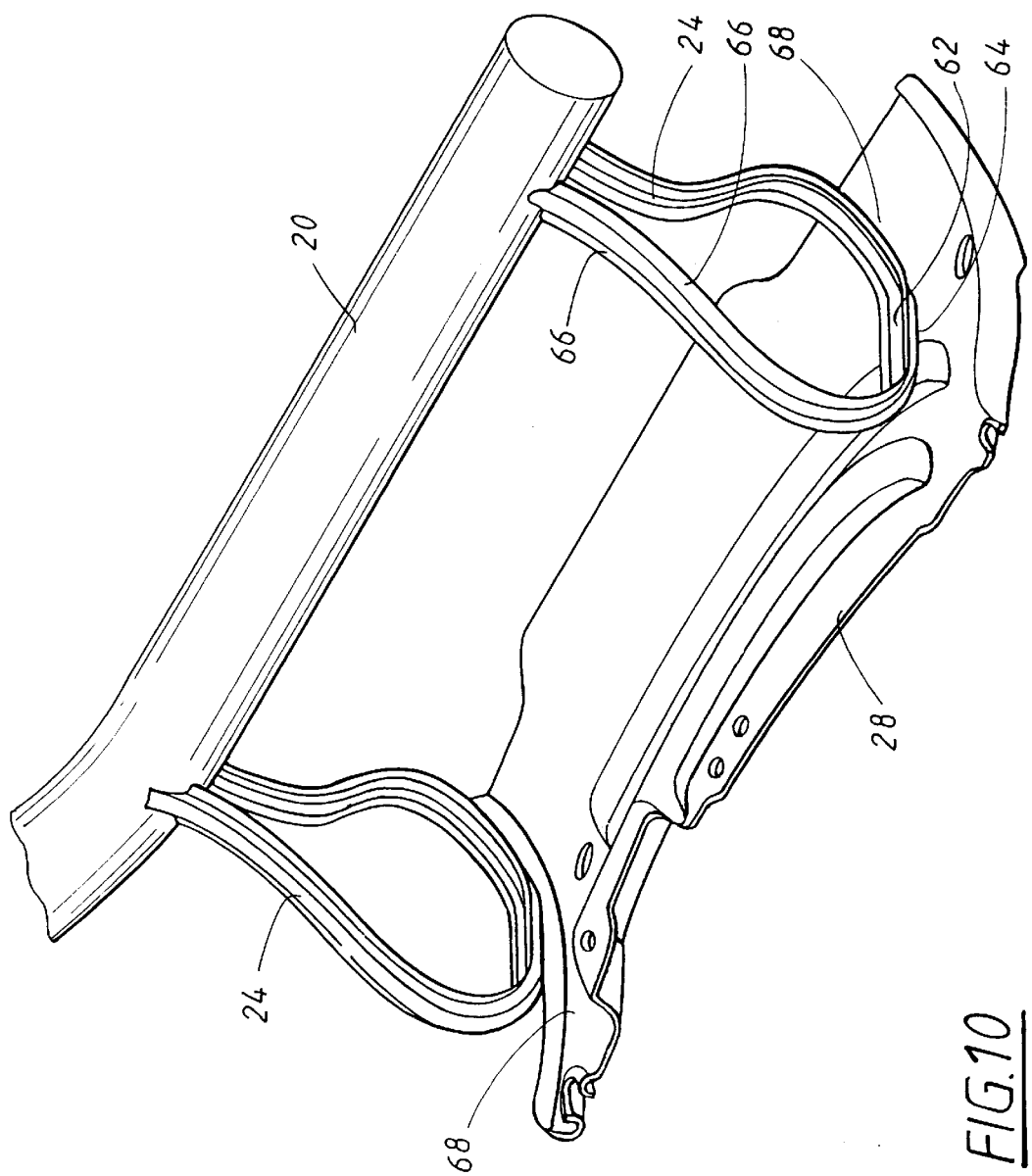
FIG. 10 is a schematic perspective view of a second reinforced panel for use in the system of the present invention.

With particular reference to FIGS. 2 and 10, the knee protection system on the passenger side of the vehicle will now be described.

Each bracket 24 of the second pair of brackets has a first distal end 56 and a second distal end 58. The first and second distal ends are arranged to be affixed, for example by welding, to the transversely extending support member 20 within the dashboard such that the bracket 24 and a portion 60 of the support member 20 form a closed loop having a flattened portion 62 opposite the support member. The flattened portion 62 presents an impact surface 64 on a surface of the bracket facing away from the support member 20. Since the mounted bracket is in the form of a closed loop, the width of each bracket, i.e. the extension of the bracket in the transverse direction of the vehicle, can be made very small, for example between 15 and 30 mm, preferably about 22 mm. This implies that the brackets do not take up a great amount of space, thereby permitting a relatively large glovebox to be positioned between the second pair of brackets 24.

Each bracket 24 has a generally U-shaped cross section with outwardly extending continuous flanges 66. In contrast to the first pair of brackets, the cross section of each bracket of the second pair of brackets 24 is substantially constant between the first and second distal ends. Advantageously, each bracket 24 is made from CR4 steel according to ISO 3574, 1986, and is made in one piece by roller bending a strip of the steel.

The impact surfaces 64 of the second pair of brackets 24 are arranged to be contacted by the second reinforced panel 28 in the event of a collision in which a passenger is thrown forward towards the dashboard 10. As with the first reinforced panel 26, the second reinforced panel 28 is made from a relatively stiff material such as GMT. A preferred construction of the second reinforced panel 28 comprises a layer of GE Azdel PD1-1357 facing towards the passenger bonded to two layers of GE Azdel U421 B01. The total thickness of the second reinforced panel is generally between about 3 mm and 7 mm.

The second reinforced panel 28 may be affixed to an existing glovebox lid 18 by any suitable means, for example using self tapping screws or the like. Preferably, the panel is mounted on the inside of the glovebox lid so as not to be visible when the lid is closed. Thus, the second reinforced panel has a generally rectangular shape adapted to the shape of the glovebox lid.

As is apparent from FIGS. 2 and 10, the second reinforced panel 28 extends spaced from and transversely between and beyond the second pair of brackets 24 such that lateral regions 68 of the reinforced panel cooperate with the impact surfaces 64 of the brackets in the event of a collision. As with the first reinforced panel, the second reinforced panel may be provided with guide surfaces to ensure accurate relative alignment of the the panel and the brackets in the event of a collision, particularly if an out-of-position force is applied to the panel.

Indeed, in many vehicles, a front seat passenger does not sit directly in front of the glovebox lid. As such, any impact between the knees of a passenger and the glovebox lid 18 will result in an asymmetrical force being applied to the glovebox lid and consequently to the second pair of brackets 24. To ensure that the force is adequately absorbed by the brackets, it is advantageous if one of the brackets is stiffer than the other. This is easily achieved by providing one bracket with a greater depth of cross section than the other bracket. Typically one bracket may have a transverse width of about 22 mm and a cross sectional depth of about 13 mm, whilst the other bracket has the same width but a depth of about 10 mm instead.

In order to further ensure that the second pair of brackets 24 will collapse in a desired manner in the event of a collision, interior portions of the dashboard may be provided with (not shown) suitable guiding means.

Due to the fact that both the first reinforced panel 26 and the second reinforced panel 28 are adapted to be affixed to existing dashboard components and are not affixed to the brackets, assembly of the knee protection system is facilitated at the same time that the panels can be simply excluded from vehicles for markets for which such a protection system is not warranted.

It is to be understood that the present invention is not deemed to be restricted to the embodiments described above and shown in the drawings, but may be varied freely within the scope of the appended claims. For example, the second reinforced panel need not necessarily be attached to a glovebox lid, but instead to any part of the dashboard which may be contacted by the knees of a passenger.

What is claimed is:

1. A knee protection system for a vehicle, said vehicle comprising a dashboard having at least one component, and a support member extending transversely across said vehicle within said dashboard, said system comprising:

at least one pair of brackets affixed to and spaced along said support member, each bracket having an impact surface spaced from said dashboard, at least one reinforced panel separate from both said dashboard and said brackets, said reinforced panel being configured to be interposed between said dashboard and said brackets and to include guide surfaces cooperating with said impact surfaces of said brackets for maintaining lateral alignment, in the longitudinal direction of the vehicle, of the reinforced panel and the brackets in the event of a collision, and means for affixing said panel to said component of said dashboard at a location spaced from said impact surface of each bracket.

2. The knee protection system as claimed in claim 1, wherein said vehicle comprises a passenger side and a driver's side, said system comprising a first pair of said at least one pair of brackets on said driver's side of said vehicle and a second pair of said at least one pair of brackets on said passenger side of said vehicle.

3. The knee protection system as claimed in claim 2, wherein each bracket of said first pair of said at least one pair of brackets has a first free end region for attachment to said support member and a second free end region incorporating said impact surface, said second free end region being generally upwardly curved with respect to said first free end region such that said bracket is generally U-shaped in a plane of extension from said first free end region to said second free end region.

4. The knee protection system as claimed in claim 3, wherein each bracket has a cross sectional shape which varies from said first free end region to said second free end region, said cross sectional shape being generally U-shaped with outwardly extending continuous flanges, the U-shape having maximum depth in said first free end region, whereafter said depth decreases towards said second free end region until a first point is reached at which said depth is a minimum, said bracket thereafter exhibiting a raised central portion increasing in height from said first point to a second point along said bracket generally coinciding with a point at which said bracket becomes upwardly curved, said height of said raised central portion thereafter decreasing towards said second free end region until, at a distal end of said second free end region, said cross-sectional shape exhibits a substantially planar bottom.

5. The knee protection system as claimed in claim 4, wherein said impact surface is incorporated on a surface of the second free end region facing away from said raised central portion.

6. The knee protection system as claimed in claim 5, wherein said reinforced panel is affixed to at least one component of said dashboard on said driver's side, said panel being made from GMT and having a generally U-shape comprising a pair of generally parallel members, each member being adapted to cooperate with said impact surface of a respective bracket of said first pair of brackets in the event of a collision.

7. The knee protection system as claimed in claim 6, wherein said reinforced panel incorporates a number of openings for fastening means for permitting the panel to be affixed to said component of said dashboard.

8. The knee protection system as claimed in claim 2, wherein each bracket of said second pair of at least one pair of brackets has a first distal end and a second distal end, said first and second distal ends being affixed to said support member such that said bracket and a portion of said support member form a closed loop having a flattened portion opposite said support member.

9. The knee protection system as claimed in claim 8, wherein said impact surface of said bracket is comprised in said flattened portion of said closed loop.

10. The knee protection system as claimed in claim 9, wherein each bracket has a generally U-shaped cross section with outwardly extending continuous flanges, said cross section being substantially constant between said first and second distal ends.

11. The knee protection system as claimed in claim 10, wherein said reinforced panel is affixed to a glovebox lid on said passenger side of said vehicle, said reinforced panel being generally rectangular-shaped.

12. The knee protection system as claimed in claim 11, wherein said reinforced panel extends spaced from and transversely between and beyond said second pair of brackets such that lateral regions of said reinforced panel cooperate with said impact surfaces of said brackets in the event of a collision.

13. The knee protection system as claimed in claim 12, wherein a glovebox is accommodated within said dashboard between said second pair of brackets.

14. The knee protection system as claimed in claim 10 or 13, wherein the generally U-shaped cross section of one bracket of said second pair of brackets has a depth greater than the generally U-shaped cross section of another bracket of said second pair.

15. A knee protection system for a vehicle, said vehicle comprising a dashboard having at least one component and a support member extending transversely across said vehicle within said dashboard, said vehicle having a passenger side and a driver's side, said system comprising:
   a first pair of brackets affixed to and spaced along said support member on said driver's side, each bracket of said first pair of brackets having a first free end region for attachment to said support member and a second free end region remote from said support member, and
   a second pair of brackets affixed to and spaced along said support member on said passenger side, said first pair of brackets being adapted to cooperate with a first reinforced panel on said dashboard on said driver's side and said second pair of brackets being adapted to cooperate with a second reinforced panel on said dashboard on said passenger side,
   wherein each bracket of said second pair of brackets has a first distal end and a second distal end, said first and second distal ends being affixed to said support member such that said bracket and a portion of said support member form a closed loop having a flattened portion opposite said support member.

16. The knee protection system as claimed in claim 15, wherein said first and second reinforced panels are affixed to a component of said dashboard.

17. A vehicle provided with a knee protection system as claimed in claim 15.

18. A knee protection system for a vehicle, said vehicle comprising a dashboard having at least one component, and a support member extending transversely across said vehicle within said dashboard, said system comprising:
   at least one pair of brackets affixed to and spaced along said support member, each bracket having an impact surface spaced from said dashboard,
   at least one reinforced panel separate from both said dashboard and said brackets, said reinforced panel being configured to be interposed between said dashboard and said brackets and to include surfaces which cooperate with said impact surfaces of said brackets, and
   means for affixing said panel to said component of said dashboard at a location spaced from said impact surface of each bracket, wherein
   said vehicle comprises a passenger side and a driver's side, said system comprising a first pair of said at least one pair of brackets on said driver's side of said vehicle and a second pair of said at least one pair of brackets on said passenger side of said vehicle,
   each bracket of said first pair of said at least one pair of brackets has a first free end region for attachment to said support member and a second free end region incorporating said impact surface, said second free end region being generally upwardly curved with respect to said first free end region such that said bracket is generally U-shaped in a plane of extension from said first free end region to said second free end region,
   each bracket has a cross sectional shape which varies from said first free end region to said second free end region, said cross sectional shape being generally U-shaped with outwardly extending continuous flanges, the U-shape having maximum depth in said first free end region, whereafter said depth decreases towards said second free end region until a first point is reached at which said depth is a minimum, said bracket thereafter exhibiting a raised central portion increasing in height from said first point to a second point along said bracket generally coinciding with a point at which said bracket becomes upwardly curved, said height of said raised central portion thereafter decreasing towards said second free end region until, at a distal end of said second free end region, said cross-sectional shape exhibits a substantially planar bottom.

19. The knee protection system as claimed in claim 18, wherein said impact surface is incorporated on a surface of the second free end region facing away from said raised central portion.

20. The knee protection system as claimed in claim 19, wherein said reinforced panel is affixed to said component of said dashboard on said driver's side, said panel being made from GMT and having a generally U-shape comprising a pair of generally parallel members, each member being adapted to cooperate with said impact surface of a respective bracket of one of said pairs of brackets in the event of a collision.

21. The knee protection system as claimed in claim 20, wherein said reinforced panel incorporates a number of openings for fastening means for permitting the panel to be affixed to said component of said dashboard.

22. A knee protection system for a vehicle, said vehicle comprising a dashboard having at least one component, and a support member extending transversely across said vehicle within said dashboard, said system comprising:

at least one pair of brackets affixed to and spaced along said support member, each bracket having an impact surface spaced from said dashboard, at least one reinforced panel separate from both said dashboard and said brackets, said reinforced panel being configured to be interposed between said dashboard and said brackets and to include surfaces which cooperate with said impact surfaces of said brackets, and means for affixing said panel to said a component of said dashboard at a location spaced from said impact surface of each bracket, wherein said vehicle comprises a passenger side and a driver's side, said system comprising a first pair of said at least one pair of brackets on said driver's side of said vehicle and a second pair of said at least one pair of brackets on said passenger side of said vehicle, each bracket of said second pair of at least one pair of brackets has a first distal end and a second distal end, said first and second distal ends being affixed to said support member such that said bracket and a portion of said support member form a closed loop having a flattened portion opposite said support member.

23. The knee protection system as claimed in claim 22, wherein said impact surface of said bracket is comprised in said flattened portion of said closed loop.

24. The knee protection system as claimed in claim 23, wherein each bracket has generally U-shaped cross section with outwardly extending continuous flanges, said cross section being substantially constant between said first and second distal ends.

25. The knee protection system as claimed in claim 24, wherein said reinforced panel is affixed to a glovebox lid on said passenger side of said vehicle, said reinforced panel being generally rectangular-shaped.

26. The knee protection system as claimed in claim 25, wherein said reinforced panel extends spaced from and transversely between and beyond said second pair of brackets such that lateral regions of said reinforced panel cooperate with said impact surfaces of said brackets in the event of a collision.

27. The knee protection system as claimed in claim 26, wherein a glovebox is accommodated within said dashboard between said second pair of brackets.

28. The knee protection system as claimed in claim 24, wherein the generally U-shaped cross section of one bracket of said second pair of brackets has a depth greater than the generally U-shaped cross section of another bracket of said second pair.

\* \* \* \* \*